Aug. 23, 1960 C. L. EASTBURG 2,950,002
PACKAGED BEARING ASSEMBLIES
Filed April 5, 1957 2 Sheets-Sheet 1
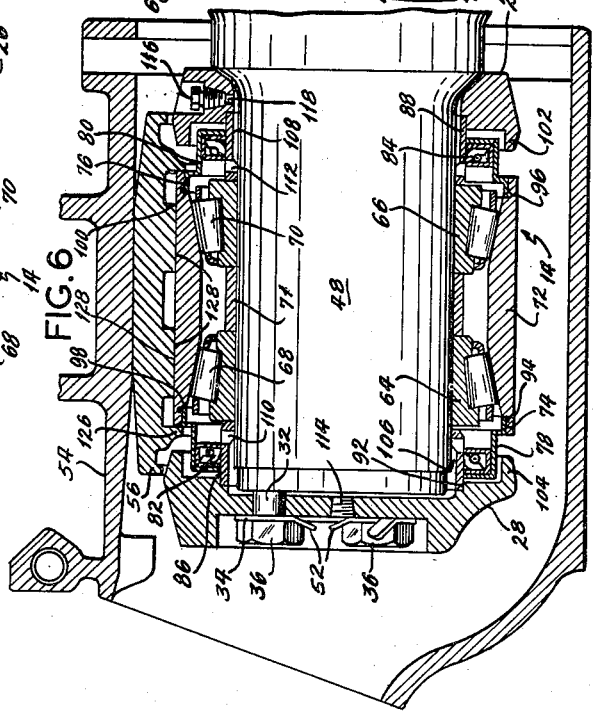
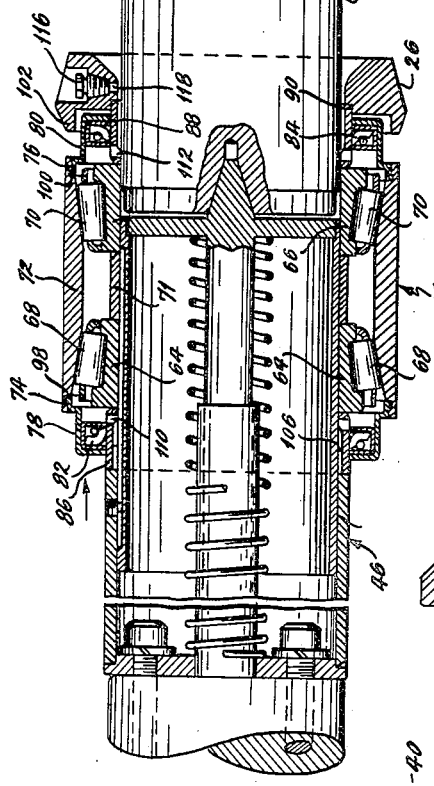
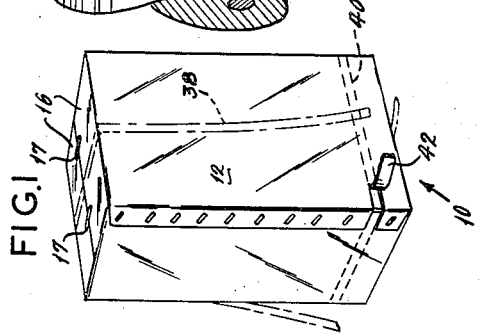
INVENTOR:
CLIFFORD L. EASTBURG
By Gravely, Lieder, Woodruff and Wille
ATTORNEYS.

Aug. 23, 1960  C. L. EASTBURG  2,950,002
PACKAGED BEARING ASSEMBLIES
Filed April 5, 1957                                         2 Sheets-Sheet 2
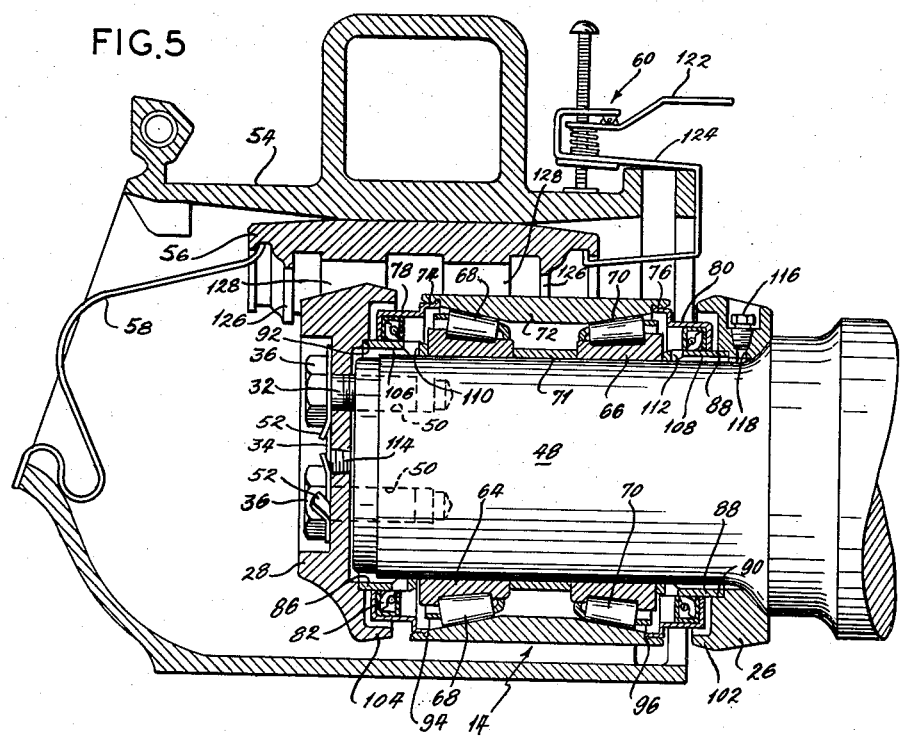
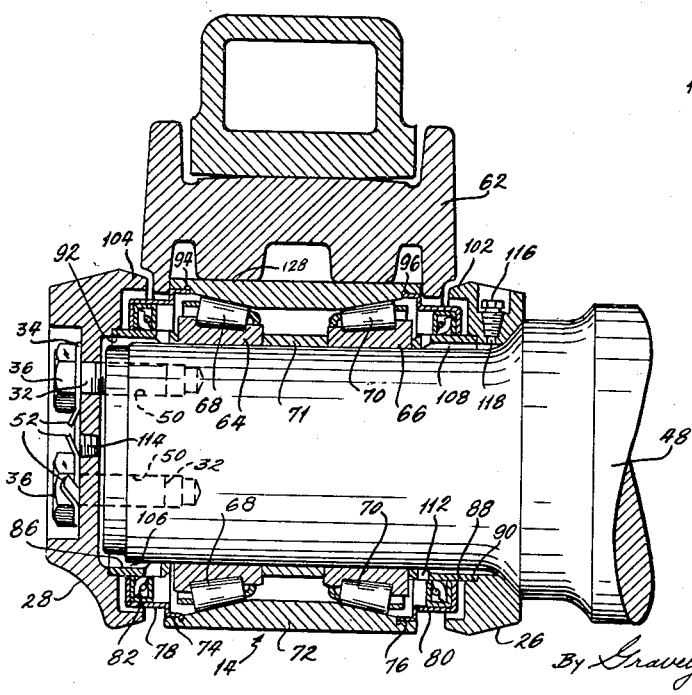
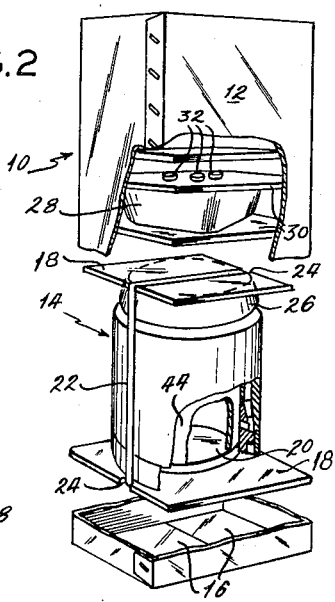
INVENTOR:
CLIFFORD L. EASTBURG
By Gravely, Lieder, Woodruff and Wills
ATTORNEYS.

United States Patent Office 2,950,002
Patented Aug. 23, 1960

2,950,002

PACKAGED BEARING ASSEMBLIES

Clifford L. Eastburg, Canton, Ohio, assignor to The Timken Roller Bearing Company, Canton, Ohio, a corporation of Ohio Filed Apr. 5, 1957, Ser. No. 651,096

7 Claims. (Cl. 206—46)

The present invention relates to means for packaging bearing assemblies and the like and more particularly to a packaged type preassembled, preadjusted and prelubricated bearing assembly and to a method for installing the assembly.

It has been the practice heretofore to supply bearing assemblies to users such as railroad car builders and the like by shipping the several components thereof in separate containers and in disassembled and unlubricated form. The user then had to assemble the components for each bearing assembly, to adjust the assembly, and finally to install and lubricate the assembly. All of these steps require considerable time and skill which is often not available, particularly in the instances where bearing repair is the reason for wanting parts.

This invention overcomes the disadvantages of lack of skilled mechanics and equipment for handling bearings requiring precision installation by a novel packaging method. The invention teaches the construction of packaging means for shipping preassembled, preadjusted, and prelubricated bearing assemblies and also teaches a method for installing the assemblies in their assembled, adjusted and lubricated conditions.

A principal object of the present invention is to reduce the packaging and installation costs of bearing assemblies and to simplify the stock room handling thereof by putting all parts for each assembly in one container.

Another object is to eliminate contamination to bearings and bearing lubricant caused by dirt and other foreign matter.

Another object is to provide positive assurance that all bearing assemblies enter service with adequate lubrication.

Another object of the invention is to provide a simple method for installing bearing assemblies in service which does not require special skills or equipment.

Another object is to assemble, adjust, lubricate and package bearing assemblies at the manufacturing level thereby reducing the over-all cost of bearing assemblies.

Another object of the invention is to provide a method and means for packaging preadjusted, prelubricated and preassembled bearing assemblies which is adaptable for use with many different bearing constructions and applications.

Another object of the invention is to conserve space in plants where bearing assemblies are installed by putting all the parts for one bearing assembly in one package or container.

Another object of the invention is to provide a bearing user with uniformly and accurately adjusted and lubricated bearing assemblies.

Yet another object is to provide a package for shipping bearing assemblies and the like which is quickly opened by a tear strip and which can be collapsed flat for easy disposal using a minimum of space.

Other objects and advantages for the present invention will be apparent after considering the following detailed specification in conjunction with the accompanying drawings wherein:

Fig. 1 is a perspective view of a package employed for shipping and storing bearing assemblies, Fig. 2 is an exploded perspective view, partly cut away, of a preassembled, preadjusted, and prelubricated bearing assembly and the shipping package therefor, Fig. 3 is a fragmentary cross-sectional elevational view of a bearing assembly packaged according to the teachings of this invention being mounted on an installing ram, Fig. 4 is an elevational view, partly in section, through a bearing assembly showing the assembly being installed on a journal member, Fig. 5 is a cross-sectional elevational view of the bearing assembly of Fig. 4 during installation in a journal housing therefor, Fig. 6 is a cross-sectional elevational view of the same bearing assembly of Fig. 5 shown in its fully installed condition, and Fig. 7 is a view similar to Fig. 6 but showing a modified form of the bearing assembly and mounting therefor.

Referring to the drawing more particularly by reference numerals, the number 10 (Figs. 1 and 2) refers to a package which is for shipping and storing a preassembled, preadjusted, and prelubricated bearing assembly. The package 10 includes a box-like portion 12 in which a bearing assembly 14 is positioned. Each end of the box-like portion 12 is shown closed and the top end is provided with flaps 16 which are held closed by suitable staples 17 when the assembly 14 is inside.

The bearing assembly 14 which is in the package 10 is positioned between square cardboard plates 18 which prevent the bearing assembly 14 from turning or shifting therein. The plates 18 are positioned at opposite ends of the assembly 14 and have centering pilot elements 20 fixed thereto and are held in position on the assembly 14 by a metal tape 22 which extends around the plates 18 and the assembly 14 (Fig. 2). Suitable notches 24 are formed on opposite edges of the plates 18 for the tape 22. The bearing assembly 14 which is packaged between the plates 18 usually includes the bearing members themselves (as will be described hereinafter) and the backing ring 26, although it is contemplated that the backing ring 26 could be packaged between separate cardboard plates (not shown), if desired.

A bearing end cap 28 is also positioned in the package 10 between cardboard plates 30 completing the assembly 14 therein. Packaged with the end cap 28 are end cap screws 32 which extend through the end cap 28 and through one of the plates 30. A washer 34, which will be described hereinafter, is positioned between the heads 36 of the screws 32 and the end cap 28 proper.

When the bearing assembly 14, including the backing ring 26 and the end cap 28, is positioned in the package 10, the end flaps 16 are closed and the staples 17 are applied. To further secure the package it may also be desirable to employ metal straps 38 (shown in phantom, Fig. 1) around the outside of the package 10 to prevent the package from accidentally opening during transit. If a plurality of assemblies 14 are to be sent to a user, such as a freight car builder, sets of eight packaged assemblies (enough for one car) are placed on pallets and secured thereto by steel bands (not shown).

The package 10 is provided with a tear strip 40 which is fastened around the inside thereof near the bottom end (Fig. 1). The tear strip 40 is glued or otherwise attached to the package 10 and is made of high strength material such as nylon or the like. A loose end 42 of the tear strip 40 extends through the box 12 and is pulled to sever the top of the package 10 from the bottom. In the process of opening the package 10, the staples 17 that hold the top flaps 16 closed are cut to allow the package 10 to be collapsed flat for easy disposal using a minimum of space therefor. When the package 10 has been severed by the tear strip 40 and the top portion thereof removed, the bearing assembly 14 can be removed.

In addition to the external package 10, a cylindrical tube 44 (Figs. 2 and 3) is positioned extending endwardly through the packaged bearing assembly 14 and the backing ring 26. The tube 44 acts as a temporary journal to keep the parts of the assembly 14 (including the backing ring 26) in their proper assembled and adjusted relationship during shipping and storage. The tube 44 is made of disposable material such as cardboard or the like and may be discarded when it has served its purpose.

During unpacking and installing of the bearing assembly 14, the cylindrical tube 44 is stripped from the assembly 14 by a pilot sleeve or ram member 46 (Fig. 3) which is used to guide the assembly 14 when it is forced onto a journal 48. The sleeve or ram member 46 may be of the collapsible type used with a press ram (Figs. 2 and 3) or it may be of the solid type which is bolted to the end of the journal 48 (not shown).

The bearing assembly 14 is rammed on the journal 48 (Fig. 4), and the end cap 28 is bolted to the end of the journal 48 by the bolts 32 which cooperate with threaded bores 50 therein. The locking washer 34 which is positioned between the end cap 28 and the heads 36 of the bolts 32 is provided with tabs 52 which are adjacent to the sides of the bolt heads 36 and are bent outwardly against the head surfaces to prevent the bolts 32 from working loose. The locking washer 34 also acts as a washer or gasket under the bolt heads 36 and prevents leakage thereby.

It is anticipated that the procedure for installing the bearing assembly 14 outlined above can be varied depending upon the particular construction of the assembly and how it is packaged. For example, either or both the backing ring 26 and the end cap 28 can be installed as a unit with the assembly 14 or installed separately without departing from the spirit and scope of the invention.

Finally, a journal box 54 (Figs. 5 and 6) and a wedge member 56 are mounted on the bearing assembly 14 to complete the installation. The wedge 56 is shown (Fig. 5) being temporarily supported in the journal box 54 by means of clip members 58 and 60 and the installation is accomplished by moving the journal box 54 into position on the bearing assembly 14 with the wedge 56 thereabove. The wedge 56 is then lowered on the assembly 14 and the clips 58 and 60 removed. The installation is now complete and ready for operation. The wedges 56 (or adapter members 62, Fig. 7) are usually supplied to the car builder in sets attached to separate pallets and shipped with the bearing assembly packages 10.

The particular bearing assembly 14 shown in Figs. 2 through 7 includes inner race members 64 and 66, roller bearing members 68 and 70, spacer member 71, and an outer race member 72. The ends of the outer race member 72 are provided with annular grooves 74 and 76 which sealably receive annular members 78 and 80 respectively. The members 78 and 80 form annular chambers at opposite ends of bearing assembly 14 in which annular seals 82 and 84 are positioned. In this way the outer race 72 is sealably yet rotatively engaged with annular members 86 and 88 which are mounted on the journal 48 on opposite sides of the inner races 64 and 66.

The backing ring 26 has an annular groove 90 which, in the assembled condition, is fitted onto the member 88, and the end cap 28 also has an annular groove 92 which similarly fits onto the member 86 when the assembly 14 is installed on the journal 48.

The members 78 and 80 have flanged portions which are provided with outwardly extending beads 94 and 96 respectively and the annular grooves 74 and 76 in the outer race 72 are provided with round bottom grooves 98 and 100 which cooperate respectively to receive the beads 94 and 96 and to seal and retain the members 78 and 80 to the race 72.

The backing ring 26 and the end cap 28 are also provided with opposed annular overhanging lip portions 102 and 104 respectively which afford protection against damage to the seal members caused by flying particles, dirt, etc.

When the temporary journal 44, the sleeve 46, or the journal member 48, is in position extending through the bearing assembly 14, the outer surfaces thereof engage the inner surfaces of the bearing members 86, 64, 71, 66 and 88 and maintain these members in their proper assembled relationship and also prevent lubricant contained in the assembly from escaping. This is important to the invention because it means that the bearing assembly 14 can be lubricated before being packaged at the manufacturing level and the same lubricant remains in the assembly even after the assembly is installed and in operation. By so providing, the danger that a dry bearing assembly may enter service is overcome. Furthermore, being able to mount the bearing assembly in its preassembled, prelubricated and preadjusted condition eliminates the possibility of contaminating the assembly and lubricant with dirt or other foreign matter since the assembly 14 remains at all times in its assembled condition.

The annular members 86 and 88 are provided with annular grooves 106 and 108 respectively, and with connecting orifices 110 and 112. The grooves 106 and 108 and the orifices 110 and 112 provide communication between opposite ends of the bearing assembly 14 when the assembly is installed as will be shown hereinafter. When packaged, the cardboard discs 18 and tube 44 prevent the escape of lubricant from the grooves 106 and 108 and when installed, the backing ring 26, the end cap 28, and the journal 48 prevent escape of lubricant therefrom.

Relubrication, or addition of lubricant to the bearing assembly when required is accomplished by removing a plug 114, and attaching a suitable lubricating head to the threaded opening in the end cap 28 provided therefor.

A pressure relief fitting 116 is positioned in bore 118 in the backing ring 26. The fitting 116 has a spring loaded plunger (not shown) which is set at a predetermined pressure to automatically relieve the back pressure produced in the assembly when adding lubricant or at any other time when the internal pressure exceeds the setting of the relief fitting 116.

The installation of roller bearing assemblies presents a more complicated assembly problem than the installation of other types of bearing assemblies because they usually have more moving parts and require more adjustment. By being able to furnish these assemblies in assembled, adjusted, and lubricated condition to a user, the jobs requiring skilled workers and precision equipment at the user level even on the more complicated assemblies are eliminated and the customer only supplies the labor necessary to mount the assemblies.

Two different types of bearing mountings for assemblies 14 are shown in the drawings, one in Figs. 5 and 6, and another modified form in Fig. 7. The mounting shown in Figs. 5 and 6 is referred to as an integral journal box construction in which the wedge member 56 is positioned in the journal box 54. During installation in this mounting, the wedge 56 is temporarily supported in the journal box 54 by the clip members 58 and 60. The clip member 58 has a curved shape (Fig. 5) and supports the outer end of the wedge 56, and the clip member 60 has two relatively movable parts 122 and 124 which together form an adjustable spring biased clip and handle which is easy to install and remove.

The wedge 56 has spaced downwardly extending shoulders 126 which are positioned between the ends of the outer race 72 and the end cap lip 104 on one side and the backing ring lip 102 on the other side. The shoulders 126 locate the bearing assembly 14 relative to the wedge 56 and transmit the thrust loads between the journal 48 and the frame or journal box 54.

The wedge 56 also has lands 128 which mate with the outer race 72 at locations above the bearing rollers 68 and 70. The lands 128 serve to concentrate the load over the rollers 68 and 70 and prevent overloading the thin portions of the outer race 72.

Fig. 7 shows an adapter type construction instead of the integral journal box construction shown in Figs. 5 and 6.

Both types of mountings shown (Figs. 6 and 7) allow the outer race 72 to creep circumferentially relative to the wedge 56 (or adapter 62) which has the advantage of constantly changing the load on the outer race 72 thereby extending its life. The circumferential creep also circulates grease which would otherwise be dormant in the bottom of the journal box.

Thus, it is apparent that there has been provided novel means for packaging assembled, adjusted, and lubricated bearing assemblies and a novel method for installing said assemblies which fulfill all of the objects and advantages sought therefor.

Naturally, the packaging means described in this specification and the particular method described for installing bearing assemblies are applicable to many different kinds of bearing assemblies and are therefore not intended to be limited or restricted to the bearing assemblies described in the specification.

It is to be understood that the foregoing description and the accompanying drawing have been presented only by way of illustration and example and that changes and alterations in the present disclosure which will be readily apparent to one skilled in the art, are contemplated as within the scope of the invention which is limited only by the claims which follow.

What I claim is:

1. Means for packaging a prelubricated bearing assembly having inner and outer races and anti-friction members positioned therebetween comprising providing a container having inside dimensions suitable for containing an assembled bearing, a tear strip attached around the inside of the container including a free end thereof which projects from the container and which can be pulled to sever the container when removing the bearing assembly therefrom, and a cylinder slidably mounted in the inner race members of the bearing assembly, said cylinder maintaining the components of the bearing assembly in assembled and adjusted condition thereon, the component members of the bearing assembly forming a lubricant chamber, and means engaged with the packaged bearing assembly sealing the lubricant chamber therein against loss of lubricant when the bearing assembly is assembled, adjusted and packaged.

2. Means for packaging a bearing assembly having inner and outer races and anti-friction members positioned therebetween comprising providing a container having inside dimensions suitable for containing an assembled and adjusted bearing assembly, a tear strip attached around the inside of the container including a free end thereof which projects outwardly through the container and which can be pulled to sever the container when removing the bearing assembly therefrom, a disposable bearing mounting simulating member positioned in the inner race members of the bearing assembly, said member maintaining the inner race members and the components of the bearing assembly associated therewith in adjustment, said inner race members and associated bearing assembly components forming a lubricant chamber and a passage into said chamber, and means engaging the bearing assembly adjacent to the chamber passage for sealing the chamber against loss of lubricant when the bearing assembly is assembled, adjusted, lubricated and packaged.

3. Means for packaging bearing assemblies in assembled, adjusted, and lubricated condition comprising a box-like container having side and end walls in which a bearing assembly is positioned, disposable spacer sheets positioned at opposite ends of the bearing assembly to cushion the bearing assembly during shipment, means including a tubular member slidably mounted in the bearing assembly, tape means extending around the bearing assembly and the disposable spacer sheets for maintaining the components of the assembly in assembled and adjusted condition and for holding the spacer sheets in abutment against the ends of the bearing assembly and tubular member, the components of the bearing assembly forming a lubricant chamber which communicates with the bearing members and with the spacer sheets at opposite ends of the packaged bearing assembly, said spacer sheets preventing lubricant in the chamber from escaping, and a tear strip attached to the inside surface of the box-like container extending around the inside surface thereof and having a loose end which projects through the container wall, said loose end enabling the tear strip to be pulled for severing the container.

4. A packaged bearing simulating installation by being assembled in adjusted and lubricated condition prior to mounting on a real vehicle axle journal, said packaged bearing including an axle journal simulating sleeve, bearing components assembled on said journal simulating sleeve in positions normally assumed on the real axle journal, lubricant sealing devices at the opposite ends of the bearing assembly, said lubricant seals and said sleeve cooperating to retain lubricant within the assembled bearing components, means at opposite ends of the said bearing assembly and cooperating with said lubricant seals to retain said seals in adjusted position relative to said bearing components, and a packaging enclosure for said assembled bearing components, axle journal simulating sleeve and retaining means, said packaging enclosure being adapted to support the assembly on said sleeve through said retaining means.

5. A package for shipping and storing an anti-friction bearing assembly in assembled, adjusted and lubricated condition, the bearing assembly including relatively movable inner and outer race members having sealing members positioned to form a chamber therebetween, and anti-friction members positioned in said chamber; comprising a package of such size as to contain the assembled bearing assembly therein, a simulated journal member positioned extending through the bearing assembly, disc members strapped to the ends of the bearing assembly in abutment with said simulated journal member to close off the ends of the bearing assembly and to prevent shifting of the assembly in the package, said package having a tear strip attached around its inner wall including a portion thereof that extends outwardly through the package which can be pulled to sever the package when removing the assembly therefrom.

6. In packaging means for maintaining a bearing construction in assembled, adjusted and lubricated condition, the bearing construction having an inner race member, an outer race member, and anti-friction members positioned therebetween, sealing means between the inner and outer race members at each end of the bearing construction forming a lubricant chamber for the anti-friction members, and a passage through the bearing construction around said sealing means through which lubricant can move into the chamber; the improvement which comprises a simulated journal member positioned in the inner race for maintaining the bearing construction in assembled and adjusted position, and sealing plates engaged with each end of the simulated journal member and with the bearing construction adjacent to the lubricant passage to close said passage and prevent escape of lubricant from the chamber therethrough.

7. A package for a railroad car side frame bearing construction including means for maintaining the bearing construction in assembled, adjusted and lubricated condition enabling the bearing to be unpackaged and installed directly in a side frame bearing housing, the bearing assembly including an inner race adapted to be positioned on a journal member, an outer race, anti-friction members positioned therebetween, and a bearing end cap including means for attaching the end cap to a railroad journal for holding the bearing assembly thereon, said inner and outer races havng adjacent opposite ends with sealing members positioned therebetween and a chamber formed between said sealing members for the anti-friction members, said package comprising a box-like container of such size that it contains the bearing construction snugly therein, and a simulated journal member positioned in the inner race for maintaining the components of the bearing construction in assembled and adjusted position in the package, and means cooperating with the bearing construction to prevent lubricant in the chamber of the construction from escaping.

References Cited in the file of this patent

UNITED STATES PATENTS

| | | |
|---|---|---|
| 1,498,245 | Le May | June 17, 1924 |
| 1,907,015 | Swart | May 2, 1933 |
| 1,947,004 | Goddard | Feb. 13, 1934 |
| 1,992,950 | Horner | Mar. 5, 1935 |
| 2,312,615 | Allen | Mar. 2, 1943 |
| 2,527,819 | Janney | Oct. 31, 1950 |
| 2,737,706 | Isaac | Mar. 13, 1956 |
| 2,762,112 | Kylen | Sept. 11, 1956 |
| 2,800,224 | Walter et al. | July 23, 1957 |